US010600010B2

(12) United States Patent
Morkos et al.

(10) Patent No.: US 10,600,010 B2
(45) Date of Patent: Mar. 24, 2020

(54) SYSTEMS AND METHODS FOR GENERATING SCHEDULING OPTIONS IN CONSIDERATION OF ELEMENTS WITHIN A CONSTRUCTION SITE

(71) Applicant: The Board of Trustees of the Leland Stanford Junior University, Stanford, CA (US)

(72) Inventors: Rene Morkos, Mountain View, CA (US); Martin Fischer, Menlo Park, CA (US); John Clayton Kunz, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 619 days.

(21) Appl. No.: 13/831,946

(22) Filed: Mar. 15, 2013

(65) Prior Publication Data
US 2014/0277666 A1 Sep. 18, 2014

(51) Int. Cl.
G06Q 10/06 (2012.01)
G06Q 50/08 (2012.01)
(52) U.S. Cl.
CPC ....... *G06Q 10/06* (2013.01); *G06Q 10/06313* (2013.01); *G06Q 50/08* (2013.01)
(58) Field of Classification Search
None
See application file for complete search history.

(56) References Cited

U.S. PATENT DOCUMENTS

| 5,189,606 | A | 2/1993 | Pryor et al. |
| 5,948,040 | A | 9/1999 | Delorme et al. |
| 6,393,410 | B1 | 5/2002 | Thompson |
| 6,414,679 | B1 | 7/2002 | Miodonski et al. |
| 6,446,053 | B1 | 9/2002 | Elliott |
| 2002/0040304 | A1 | 4/2002 | Shenoy et al. |
| 2003/0078798 | A1 | 4/2003 | Zaks et al. |
| 2003/0225683 | A1 | 12/2003 | Hill et al. |

(Continued)

FOREIGN PATENT DOCUMENTS

| KR | 20120137739 A | * | 12/2012 | ............. G06Q 50/08 |
| WO | WO-02091300 A2 | * | 11/2002 | ......... G06F 17/5004 |

OTHER PUBLICATIONS

Dong, Ning. "Automated Look-Ahead Schedule Generation and Optimization for the Finishing Phase of Complex Construction Projects." Center for Integrated Facility Engineering (CIFE), CIFE Technical Report #TR211, Jun. 2012, Retrieved from [URL: http://cife.stanford.edu/sites/default/files/TR211.pdf].*

(Continued)

*Primary Examiner* — Susanna M. Diaz
(74) *Attorney, Agent, or Firm* — KPPB LLP

(57) ABSTRACT

Systems and methods for generating scheduling options in consideration of space and resource constraints in accordance with embodiments of the invention are disclosed. One embodiment of the invention includes a scheduling application that configures the processor to generate a project schedule from a TODO list comprising a plurality of construction operations, where the construction operations comprise at least one specific space requirements within a construction site, resource requirements, and a duration time.

25 Claims, 11 Drawing Sheets

(56) References Cited

U.S. PATENT DOCUMENTS

| | | | |
|---|---|---|---|
| 2006/0044307 A1* | 3/2006 | Song ..................... | G06Q 10/06 |
| | | | 345/419 |
| 2007/0027732 A1* | 2/2007 | Hudgens ............... | G06Q 10/06 |
| | | | 705/7.15 |
| 2010/0185547 A1 | 7/2010 | Scholar et al. | |
| 2013/0155058 A1* | 6/2013 | Golparvar-Fard .... | G06T 19/006 |
| | | | 345/419 |
| 2014/0095119 A1* | 4/2014 | Lee ....................... | G06Q 50/08 |
| | | | 703/1 |

OTHER PUBLICATIONS

English Translation of KR2012004641, Method and System for Position-Based Construction Site Management.*

* cited by examiner

| ID | Description | Duration | Predecessor | Required 1st space lower left X,Y,Z coordinates | Required 1st space upper right X,Y,Z coordinates | Required 2nd space lower left X,Y,Z coordinates | Required 2nd space upper right X,Y,Z coordinates | Time remaining |
|---|---|---|---|---|---|---|---|---|
| OR1 | Install Rebar for column C1 | 2 | Cure Slab under column (OCr1) | LL X1,Y1,Z1 | UR X1,Y1,Z1 | LL X11,Y11,Z11 | UR X11,X13 | |
| OF1 | Install Formwork for column C1 | 2 | OR1 | LL X2,Y2,Z2 | UR X2,Y2,Z2 | LL X12,Y12,Z12 | UR X12,Y12,Z12 | |
| OC1 | Pour Concrete for column C1 | 2 | OF1 | LL X3,Y3,Z3 | UR X3,Y3,Z3 | LL X13,Y13,Z13 | UR X13,Y13,Z13 | |
| OS1 | Strip formwork for column C1 | 2 | OC1 | LL X4,Y4,Z4 | UR X4,Y4,Z4 | LL X14,Y14,Z14 | UR X14,Y14,Z14 | |
| | . . . | . . . | . . . | . . . | . . . | . . . | . . . | |
| OCu2 | Cure column 2 | 2 | OS2 | LL X10, Y10, Z10 | UR X10,Y10,Z10 | LL X20, Y20, Z20 | UR X20,Y20,Z20 | |

*FIG. 5D*

SYSTEMS AND METHODS FOR GENERATING SCHEDULING OPTIONS IN CONSIDERATION OF ELEMENTS WITHIN A CONSTRUCTION SITE

FIELD OF THE INVENTION

The present invention generally relates to construction project management and more specifically to systems and methods for generating scheduling options in consideration of specific space and resource constraints.

BACKGROUND

The process of construction can vary significantly depending on the scope of the project and the particulars of the structure. Construction processes can be categorized as residential, industrial, commercial, or civil to name a few. Many construction processes have a basic life cycle that includes design, planning (preconstruction), building (construction), and operation and maintenance (O&M). During the design phase, 3D models or 2D layouts and cross-sections are created to represent the end product. The end product, also referred to as product, is the building, bridge, airport or other structure that needs to be built or reconstructed. Once the designs (e.g., architectural, structural, mechanical) are completed, the building process shifts to the preconstruction and construction phases where managing the project can be critical. Project management may include activities such as purchasing materials, hiring work crews, finalizing required tasks, and creating schedules (i.e. specifying the start and end times of construction tasks, effectively ordering the tasks to maximize efficiency). Once the product is built, the final phase of the project lifecycle process can include maintenance and building operations.

The so called critical path method (CPM) is a project management technique used for creating schedules. The basic steps of CPM include creating a list of all the required tasks, including the duration of time allocated to complete the task, and identifying task dependencies (i.e. situation where a task cannot start until its predecessor tasks are completed). Using the list of tasks, their durations, and predecessors, CPM determines the shortest time to complete the project not taking into account space and resource requirements. Further, CPM visually presents the earliest and latest time that a task can start and finish (without accounting for specific space and resource requirements) without increasing the duration of the project. CPM identifies critical tasks (tasks that cannot be delayed without delaying the project's duration) and so called floats (tasks that can be delayed without extending the project's duration). A critical path is determined by chronologically ordering the critical tasks. In many instances, construction tasks can be performed in parallel provided work crews are not operating in the same space in such a way that they will interfere with each other. Therefore, an important aspect of scheduling tasks can be attempting to avoid conflicting needs for access to space within a construction site.

Another technique used in scheduling is the so called line of balance (LOB) method. The LOB method includes creating a chart with time (traditionally calendar days in sequential order) along the top and location or zones of the construction site along on the left hand side. A line representing a particular task is sketched starting from the bottom left of the chart progressing upwards from zone to zone and to the right (passage of time). By observing points on the line, a project manager can know the zone and time that a task is to be performed in. Multiple lines representing multiple tasks are placed on the chart to simultaneously visualize the location and time that tasks are progressing along the construction process. The LOB method is useful for predicting lag time between two separate works.

Building Information Models are 3D object oriented models that include information about the product such as the architectural elements, the material they are made of, locations and other information. Linking a 3D model, such as Building Information Model (BIM), to a schedule results in a 4D model. A 4D model is an animated step-by-step visualization of the progression of the construction process in a series of sequential events. Therefore 4D models are another tool that can be used in project management.

SUMMARY OF THE INVENTION

Systems and methods in accordance with embodiments of the invention generate scheduling options that consider space and resource constraints One embodiment of the invention includes a processor, and a memory connected to the processor and configured to store a scheduling application. In addition, the scheduling application configures the processor to generate a TODO list comprising a plurality of construction operations, where the construction operations comprise at least one specific space requirements within a construction site, resource requirements, and a duration time and at least some of the construction operations further comprise at least one predecessor condition, initialize a simulated job state and a job progress time, where the simulated job state comprises a description of construction operations that have been completed, and the job progress time describes the elapsed simulated time, identify at least one construction operation in the TODO list, where all predecessor conditions are satisfied by the current simulated job state, move construction operations where all predecessor conditions are satisfied by the current simulated job state to a CANDO list, identify at least one construction operation in the CANDO list, where the resource requirements are available at the current job progress time and the spatial requirements do not clash with a construction operation on a DOING list, move identified at least one construction operation from the CANDO list to the DOING list, where adding a construction operation to the DOING list comprises allocating space and resources, update job progress time, identify at least one construction operation on the DOING list that is completed at the current job progress time and move the at least one construction operation to a DONE list, where moving the construction operation to the done list comprises releasing allocated space and resources and updating the simulated job state and generate a schedule using the DONE list.

In a further embodiment, the scheduling application further configures the processor to define the specific space requirements within the construction site using one or more X, Y, and Z coordinates.

In another embodiment, the scheduling application further configures the processor to calculate the duration time using a first production modification factor, a second production modification factor, a number of crews, crew productivity, and a quantity of construction components acted on by a construction operation, the first production modification factor is determined from a construction operation space requirement and construction operation space availability, and the second production modification factor is determined using a space requirement of a crew, a number of crews, and construction operation space availability.

In a still further embodiment, the scheduling application further configures the processor to identify at least one construction operation in the CANDO list, where the resource requirements are available at the current job progress time and the spatial requirements do not clash with a construction operation on a DOING list by comparing space requirements between construction operations for overlap and determining whether the extent of the overlap constitutes a spatial clash in accordance with at least one predetermined criterion.

In still another embodiment, the scheduling application further configures the processor to move the identified at least one construction operation from the CANDO list to the DOING list by changing the order of construction operations on the CANDO list and identifying at least one construction operation from the reordered CANDO list.

In a yet further embodiment, the scheduling application further configures the processor to move the identified at least one construction operation from the CANDO list to the DOING list, where adding a construction operation to the DOING list further comprises setting a start time for the identified at least one construction operation equal to the current job progress time.

In yet another embodiment, the scheduling application further configures the processor to move the identified at least one construction operation from the CANDO list to the DOING list, where adding a construction operation to the DOING list further comprises setting a time remaining for completion for the identified at least one construction operation equal to the duration time.

A further embodiment again also includes sorting the order of the construction operations on the DOING list such that the construction operation with the shortest time to completion is placed at the top of the DOING list, and designating the construction operation at the top of the DOING list as completed.

In another embodiment again, the scheduling application further configures the processor to identify at least one construction operation on the DOING list that is completed at the current job progress time and move at least one construction operation to a DONE list, where moving the construction operation to the doing list further comprises updating the time remaining for completion for each construction operation on the DOING list and releasing allocated resources.

In a further additional embodiment, the scheduling application further configures the processor to generate a CANDO list comprising a plurality of construction operations, where the construction operations are ranked for space utilization preference or shuffled.

In another additional embodiment, the simulated job state further comprises a description of construction operations that are ready to be performed, and construction operations that are in progress.

A still yet further embodiment includes generating a TODO list comprising a plurality of construction operations, where the construction operations comprise at least one specific space requirements within a construction site, resource requirements, and a duration time and at least some of the construction operations further comprise at least one predecessor conditions, initializing a simulated job state and a job progress time, where the simulated job state describes construction operations that have been completed, and currently taking place and the job progress time describes the elapsed simulated time, identifying at least one construction operation in the TODO list, where all predecessor conditions are satisfied by the current simulated job state, moving construction operations where all predecessor conditions are satisfied by the current simulated job state to a CANDO list, identifying at least one construction operation in the CANDO list that can be scheduled to fill available space within the construction site at the simulated job progress time, where the resource requirements are available at the current job progress time and the spatial requirements do not clash with a construction operation on a DOING list, moving identified at least one construction operation from the CANDO list to the DOING list, where adding a construction operation to the DOING list comprises allocating space and resources, updating job progress time, identifying at least one construction operation on the DOING list that is completed at the current job progress time and moving the at least one construction operation to a DONE list, where moving the construction operation to the done list comprises releasing allocated space and resources and updating the simulated job state, and generating a schedule using the DONE list.

BRIEF DESCRIPTION OF THE DRAWINGS

FIG. 5D illustrates a portion of a TODO list in accordance with an embodiment of the invention.

DETAILED DISCLOSURE OF THE INVENTION

Figure 1:
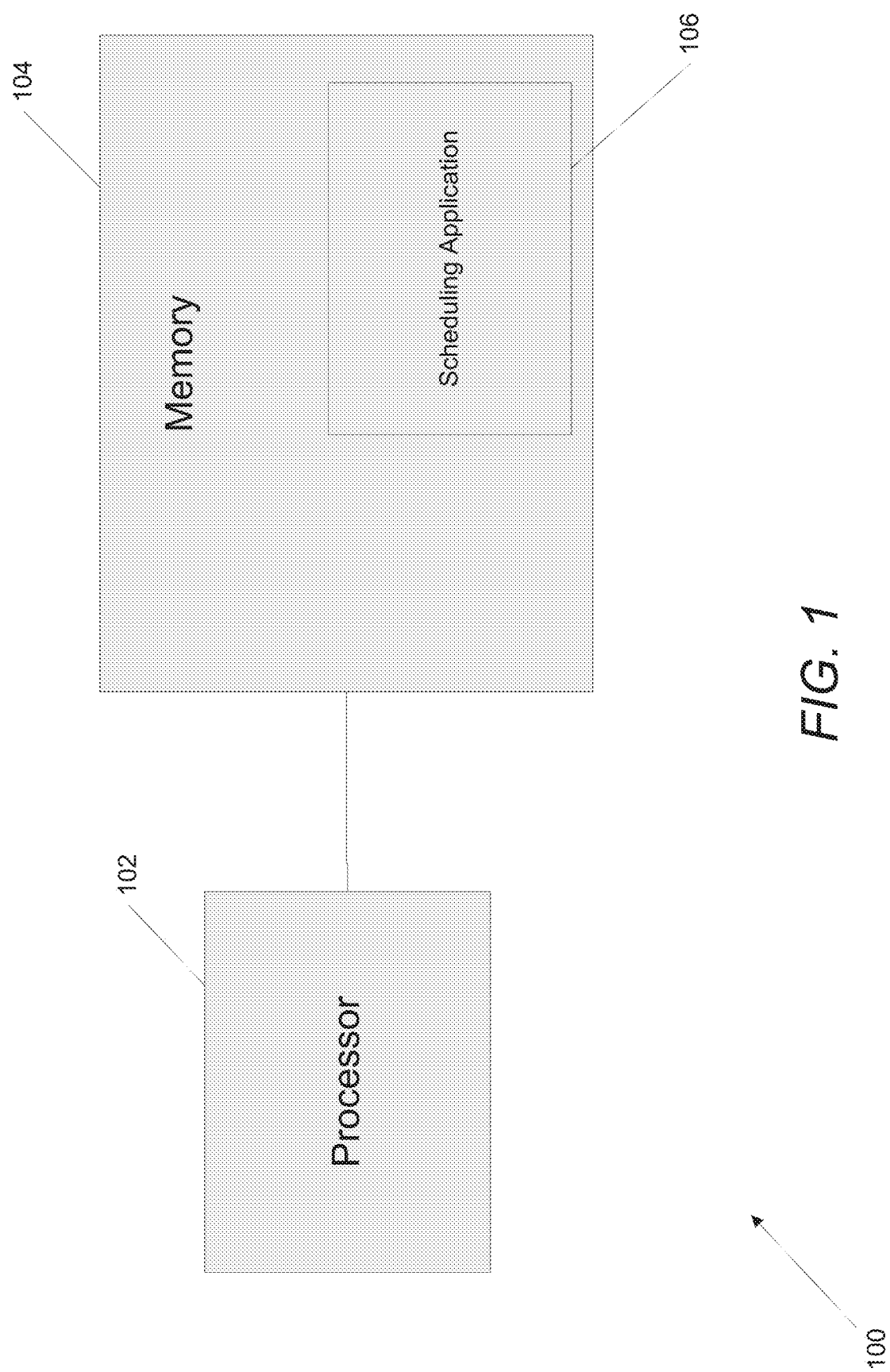
FIG. 1 is a block diagram of a schedule generation system depicting a processor connected to a memory that is configured to store a scheduling application for generating at least one schedule in accordance with an embodiment of the invention.

Turning now to the drawings, systems and methods for generating scheduling options in consideration of space and resource constraints in accordance with embodiments of the invention are described. A schedule generation system includes a processor connected to a memory configured to store a scheduling application that configures the processor to generate at least one schedule in consideration of space and resource constraints.

In several embodiments, the system generates a TODO list of construction operations where each construction operation is a description of any process that includes specific space and duration for completion requirements (including processes that are not directly related to the physical construction of an end product). In many embodiments, a construction operation also includes a description of resource requirements and predecessor conditions. The resource requirements can include work crews to carry out the construction operation. The predecessor conditions can include other construction operations that are prerequisite for the current selected construction operation. For example, a predecessor condition for pouring concrete for a column (construction operation) can be first installing formwork for the column (construction operation). In various embodiments, the construction operations can be automatically generated utilizing BIM or manually entered by a user. In various embodiments the construction predecessors can be generated utilizing BIM and artificial intelligence or entered by the user.

In many embodiments, the scheduling application configures the processor to initialize a simulated job state and a job progress time where the simulated job state describes the construction operations that have been completed and the construction operations currently in progress. The job progress time describes the elapsed simulated time. A list of operations needed to create the end product is created. This can be done through the system or created manually and used as input. This list of operations can be referred to as the TODO list. The list of operations that have been completed can be maintained in a DONE list. In several embodiments, at any given time, the construction operations in the TODO list whose predecessor conditions are present in the DONE list are moved to a CANDO list. If available at the current job progress time, the system allocates resources and a specific (3D) space within a construction site to a selected construction operation from the CANDO list. Once space and resources are allocated then the construction operation is moved from the CANDO list to a DOING list. The construction operation with the shortest time to completion (at the topmost of the DOING list) is placed in a DONE list and the system makes available the space and resources that had been allocated to that construction operation. Each time a job is moved to the DONE list, the simulated job state and job progress time are updated. In this way, construction schedules can be generated accounting for resource and specific space constraints.

In various embodiments, multiple schedules can be generated where the construction operations in the CANDO list are shuffled using a pseudorandom or random shuffler. In this way, many thousands of possible schedules can be generated involving different utilizations of specific spaces within the construction site over time. The sequence in which operations are executed is varied between schedules. In many embodiments, the costs associated with implementing each schedule can be calculated in order to select a schedule that satisfies predetermined project objectives. Systems and methods for generating schedules in consideration of space and resource constraints in accordance with embodiments of the invention are further discussed below.

Schedule Generation System Architecture

Schedule generation systems in accordance with embodiments of the invention can be utilized in generating at least one schedule avoiding spatial clashes in consideration of available resources. In many embodiments, the process of generating a schedule involves detecting spatial clashes in specific spaces within a construction site. In a number of embodiments, the exact extent of the spatial overlap within the spaces within the construction zone and/or within specific volumes within the construction zone can be identified by a schedule generation system.

A schedule generation system in accordance with an embodiment of the invention is illustrated in FIG. 1. The schedule generation system 100 includes a processor 102 connected to a memory 104 configured to store a scheduling application 106. In many embodiments, the scheduling application 106 configures the processor to generate at least one schedule that avoids spatial clashes in consideration of available resources as further described below. In several embodiments, the schedule generation system generates a schedule utilizing BIM models as inputs. In certain embodiments, a list of construction operations is provided as an input from which construction schedules can be generated. In various embodiments, multiple schedules are generated and the schedule generation system calculates the costs associated with implementing each schedule in order to select a schedule that satisfies project objectives. Although specific schedule generation systems for generating schedules avoiding spatial clashes in consideration of available resources are discussed above with respect to FIG. 1, any of a variety of schedule generation systems as appropriate to the requirements of a specific application can be utilized in accordance with embodiments of the invention. Processes for generating schedules by determining space and resource requirements in accordance with an embodiment of the invention are further discussed below.

Generating Schedules Avoiding Spatial Clashes

Figure 2:
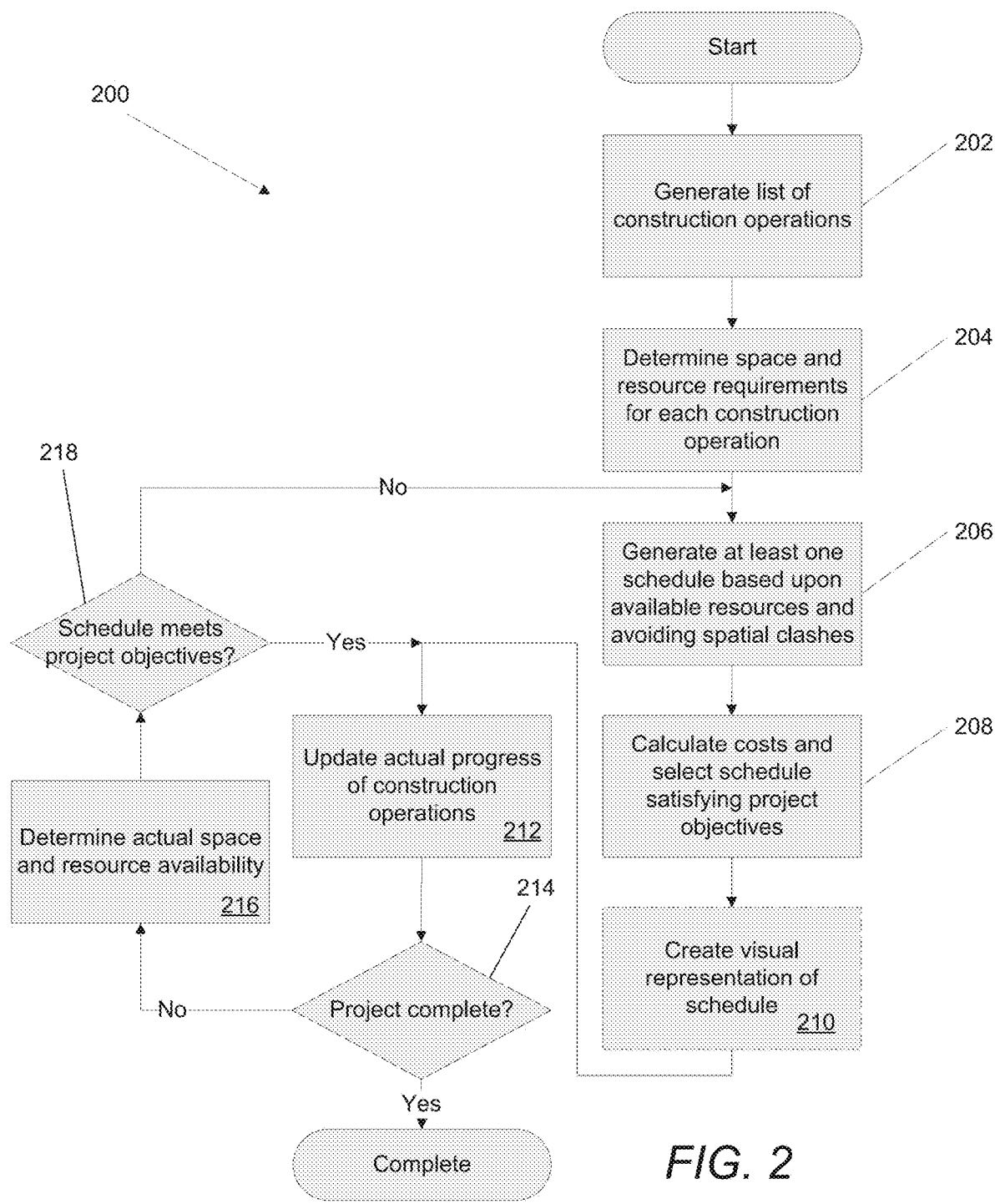
FIG. 2 is a flow chart illustrating a process for generating at least one schedule by determining space and resource requirements in accordance with an embodiment of the invention.

The use of space and resources can be significant factors in construction costs and whether project objectives are met. A process for generating at least one schedule by determining space and resource requirements in accordance with an embodiment of the invention is illustrated in FIG. 2. The process 200 includes generating (202) a list of construction operations for creating an end product (The TODO list). In various embodiments, the list of construction operations can be generated using a three dimensional (3D) computer aided design (CAD) model as described further below. The process further includes determining (204) the space and resources required for each construction operation. In many embodiments of the invention, the resource requirements include work crews skilled to perform a particular construction operation. In several embodiments, the specific space requirements can be designated by X, Y, and Z coordinates on the construction site that can be utilized to define one or more specific spaces within the construction site or any other technique for defining specific spaces within a construction site including (but not limited to) planar or volumetric coordinates. The definition of a specific space should be understood as being distinct from definition of generalized space requirement, for example, a particular job requiring 50 $m^2$ (generalized space requirement) as opposed to requiring a specific 50 $m^2$ within a job site (specific space requirement). Accordingly, any representation of a specific space within a jobsite as opposed to simply specifying a generalized space requirement can be utilized in accordance with embodiments of the invention. Using the determined space and resource requirements, at least one schedule is generated (206) avoiding spatial clashes between construction operations using techniques further described below. In many embodiments, the process includes calculating (208) the costs to implement each schedule and selecting at least one schedule that satisfies predetermined project objectives. In several embodiments, a visual representation of the generated schedule is created (210) for a user. In a number of embodiments, the visualization can involve a 4D model of the construction of the project based upon the construction schedule.

During construction, actual progress relative to the construction schedule can be routinely updated (212) until the project completes. As the project progresses, determinations (216) can be made concerning actual space and resource availability. When the actual construction schedule meets project objectives (218), then the process 200 continues to monitor construction progress. When the actual construction schedule no longer meets the project objectives (218), then a new schedule can be generated (206, 208) for use during the remainder of the project. In this way, the schedule can be updated based upon the extent to which work crews are actually able to meet the generated schedule.

Although specific processes for generating at least one schedule by determining specific space and resource requirements are discussed above with respect to FIG. 2, any of a variety of processes for generating schedules by determining space and resource requirements as appropriate to the requirements of a specific application can be utilized in accordance with embodiments of the invention. Processes for generating a list of construction operations in accordance with an embodiment of the invention are discussed further below.

Generating a List of Construction Operation

Figure 3:
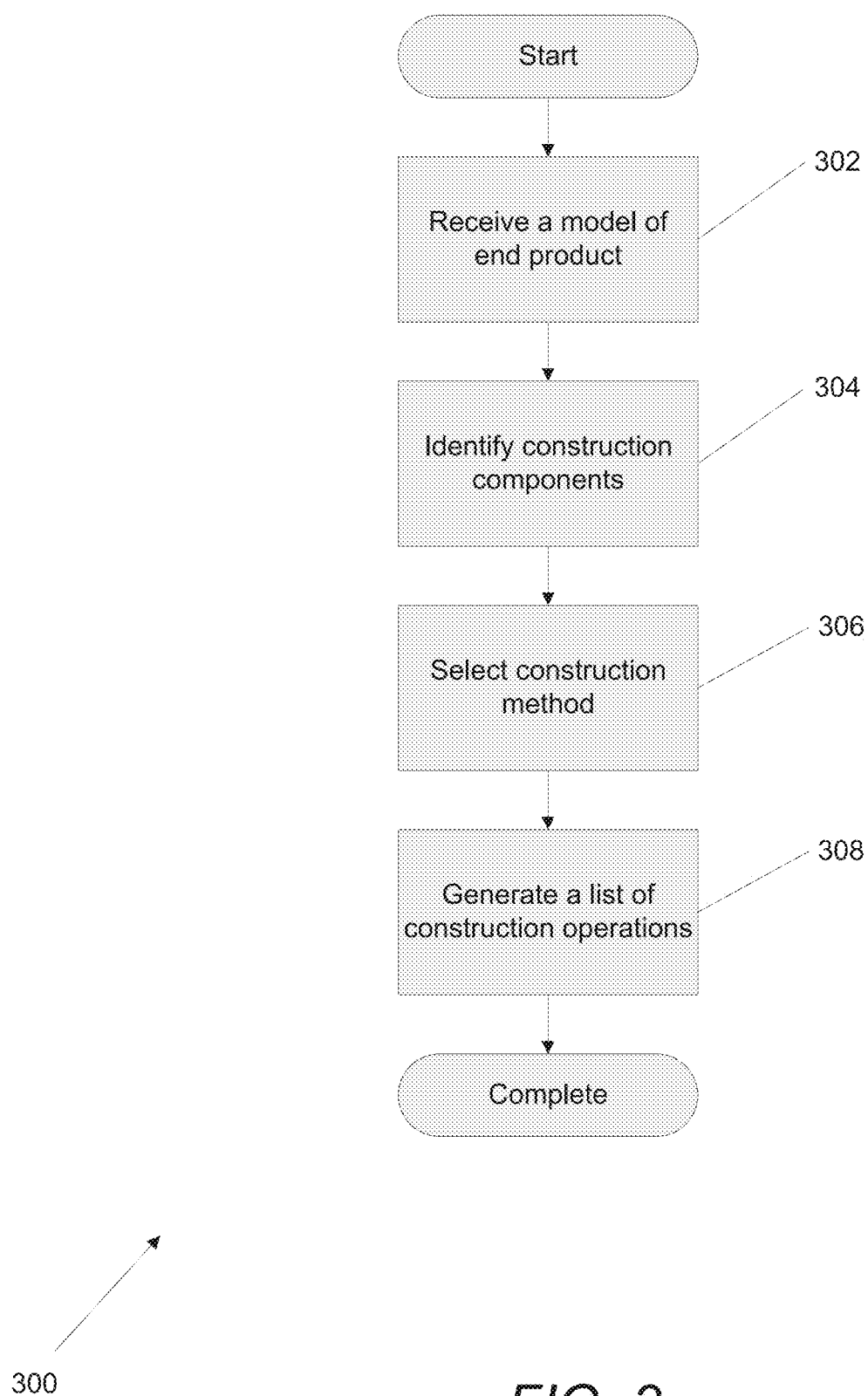
FIG. 3 is a flow chart illustrating a process for generating a list of construction operations for creating an end product in accordance with an embodiment of the invention.

In creating an end product, construction operations can be considered the tasks and/or activities that utilize construction components to implement a construction method. A process for generating a list of construction operations in accordance with an embodiment of the invention is illustrated in FIG. 3. The process 300 includes receiving (302) a model of a proposed end product that is composed of architectural elements. In several embodiments, the received model can include (but is not limited to) a 3D CAD model or a BIM model. In many embodiments, the architectural elements or construction operations can be manually entered by a user. The process further includes identifying (304) construction components. In various embodiments, the construction components can be identified by determining the materials that make up the architectural elements. For example, the architectural elements can include columns, beams, and/or slabs and the construction components for the column can include rebar and concrete. The process further includes selecting (306) a construction method. In several embodiments, a user can select the construction method from a list of various construction methods. Using the selected construction method and identified construction components, a list of construction operations is generated (308).

Although specific processes for generating a list of construction operations by receiving a model of a proposed end product are discussed above with respect to FIG. 3, any of a variety of processes for generating a list of construction operations as appropriate to the requirements of a specific application can be utilized in accordance with embodiments of the invention. Processes for determining space and resource requirements of a construction operation in accordance with embodiments of the invention are further discussed below.

Determining Space and Resource Requirements

Figure 4:
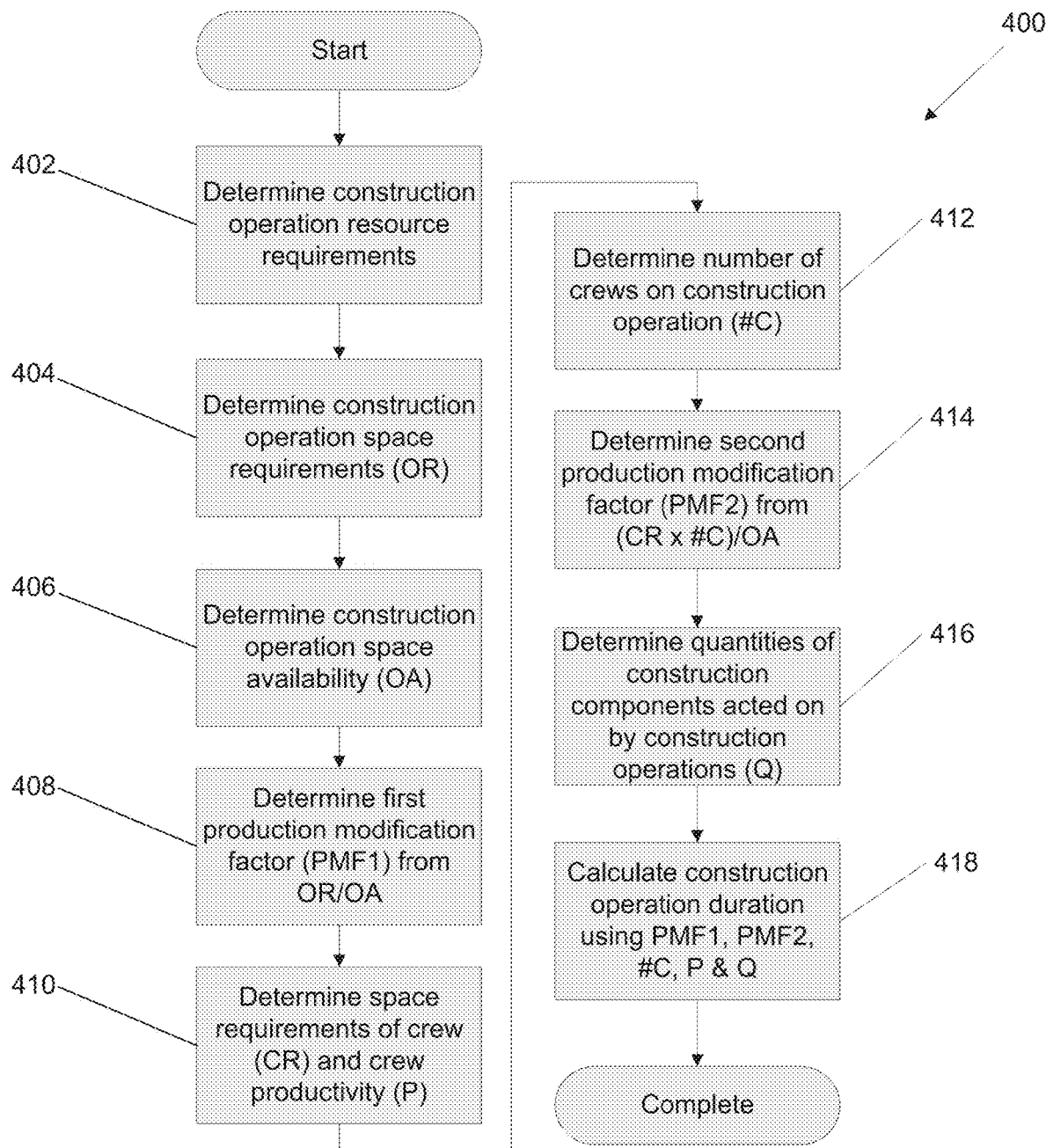
FIG. 4 is a flow chart illustrating a process for determining space and resource requirements as well as duration of a construction operation in accordance with an embodiment of the invention.

Construction operations are typically performed for a set duration of time using the resources that are currently available. A process for determining space and resource requirements of a construction operation in accordance with an embodiment of the invention is illustrated in FIG. 4. The process 400 includes determining the resource requirements of a construction operation in a manner well known to one of ordinary skill in the art. The resource requirements can include (but is not limited to) skilled work crews and construction components recommended based on BIM using artificial intelligence. The process further includes determining (404) the specific space requirements (OR) of the construction operation. In many embodiments, the application can provide recommendations. In other embodiments, the specification of specific space requirements for a construction operation is a human intelligence operation. In many embodiments, the specific space requirements can be designated by X, Y, and Z coordinates on the construction site recommended based on BIM using artificial intelligence. In other embodiments, any of a variety of techniques for identifying specific spaces can be utilized in accordance with embodiments of the invention.

Construction operation space availability (OA) can also be determined (406). The construction operation space requirements (OR) are the requirements for a specific construction operation to be performed. This requirement may not, however, correspond to the space available in which to perform the operation within a construction site. For example, a painting crew may require 5 m spacing from a wall in which to typically perform a painting construction operation. In certain areas of the construction site, a wall may form part of a hallway. In which case, only 3 m of space is available. Accordingly, the construction operation space availability (OA) indicates the actual amount of space available in which to perform a construction operation within a specific space within a construction site. In many embodiments, the construction operation space requirement (OR) and construction operation space availability (OA) can be utilized to determine a first production modification factor. In the illustrated embodiment, the first production modification factor (PMF1) is determined using the ratio of the construction operation space requirements to the construction operation space availability (OR/OA). The specific formulation of the first production modification factor (PMF1) can be determined in accordance with the requirements of a given application. The exact manner in which PMF1 is determined is largely dependent upon the requirements of a specific application. For example, the values can be pre-calculated and look up tables utilized and/or any other effective technique can be used. As is described further below, the first production modification factor (PMF1) can be utilized to calculate the anticipated construction operation duration.

The specific space requirements of a crew (CR) and the available space OA can be used to determine how many crews are assigned to the operation. The crew productivity (P) when performing the construction operation within the available space OA can also be estimated (410). Based upon the specific space requirements of the crew (CR), the numbers of crews (# C), and the construction operation available space (OA), a second production modification factor (PMF2) can be determined. In the illustrated embodiment, the second production modification factor (PMF2) is determined using of the specific space requirements of the crew (CR) and the numbers of crews (# C), divided by the construction operation available space (OA). The exact manner in which PMF2 is determined largely dependent upon the requirements of a specific application. For example, the values can be pre-calculated and look up tables utilized and/or any other effective technique can be used. The specific formulation of the second production modification factor (PMF2) can be determined in accordance with the requirements of a given application. As is described further below, the second production modification factor (PMF2) can be utilized to calculate the anticipated construction operation duration.

The process 400 can also involve determining (414) the quantities of construction components acted on by construction operations (Q). In several embodiments, the quantities of construction components acted on by construction operations (Q) are calculated by multiplying the quantity of the architectural element ($Q_E$) by a factor (F) where F is a function of the architectural element type. The specific method of calculating the quantities of construction components acted on by construction operations (Q) can be determined in accordance with the requirements of a given application. As is described further below, the quantities of construction components acted on by construction operations (Q) can be utilized to calculate the anticipated construction operation duration.

The estimated construction operation duration can then be constructed using the first production modification factor (PMF1), the second production modification factor (PMF2), the number of crews (# C), the crew productivity (P) and the quantities (Q) acted on by the construction operations. In several embodiments, the duration time is calculated by multiplying the quantities of construction components acted on by construction operations (Q) by the first and second production modification factors (PMF1 & PMF2), the number of crews (# C), and the crew productivity. In other embodiments, any of a variety of techniques can be utilized to estimate the duration of a construction operation as appropriate to the specific requirements of a given application including (but not limited to) techniques that consider fewer, more and/or different factors during the estimation process.

Although specific processes for determining space and resource requirements of a construction operation are discussed above with respect to FIG. 4, any of a variety of processes for determining space and resource requirements of an operation as appropriate to the requirements of a specific application can be utilized in accordance with embodiments of the invention. Processes for generating schedules in consideration of space and resource requirements in accordance with embodiments of the invention are further discussed below.

Generating Schedules in Consideration of Space and Resource Requirements

Figure 5A:
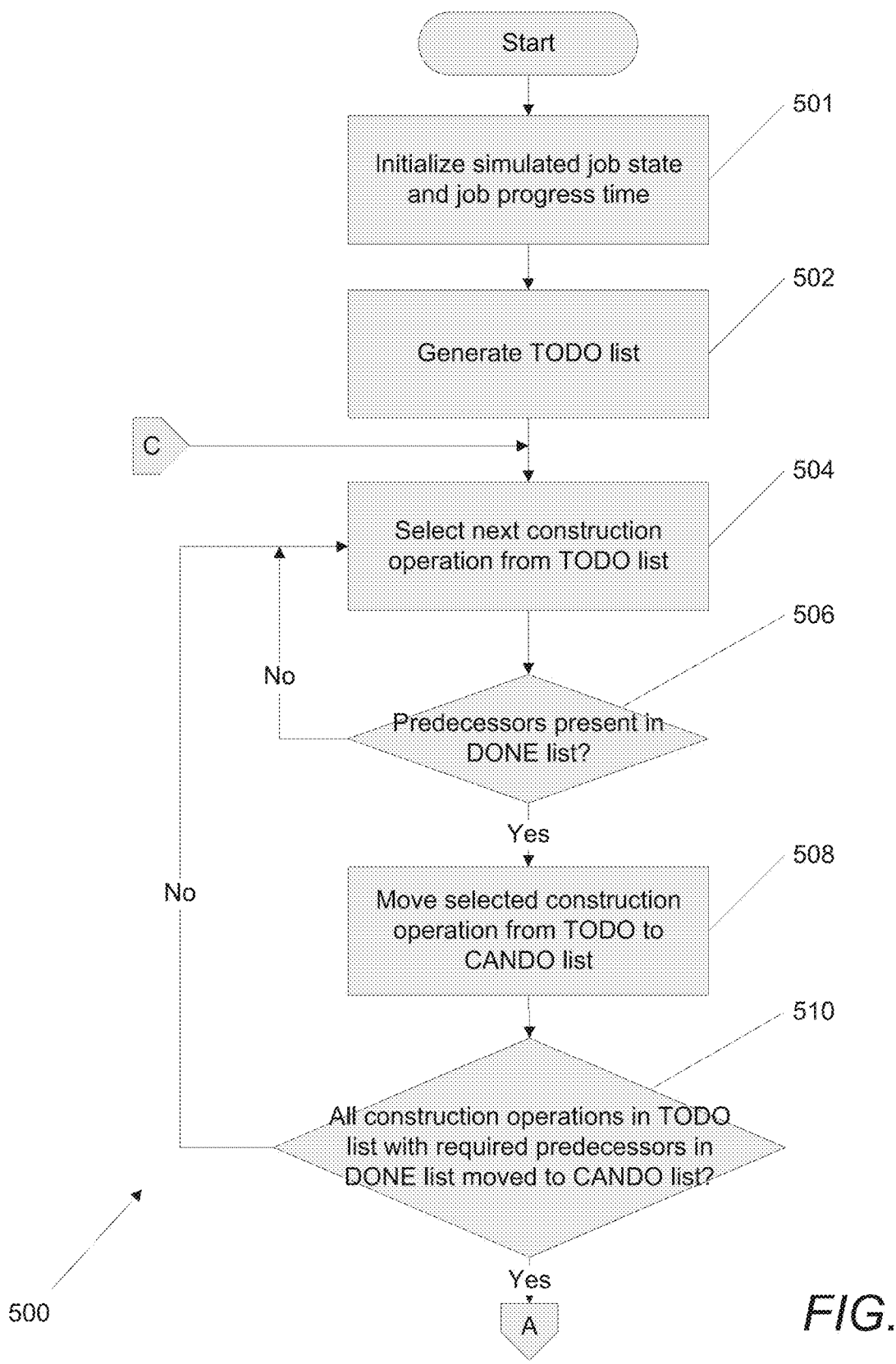
FIGS. 5A-5C illustrate a flow chart of a process for generating schedules in consideration of space and resource requirements in accordance with an embodiment of the invention.
Figure 5B:
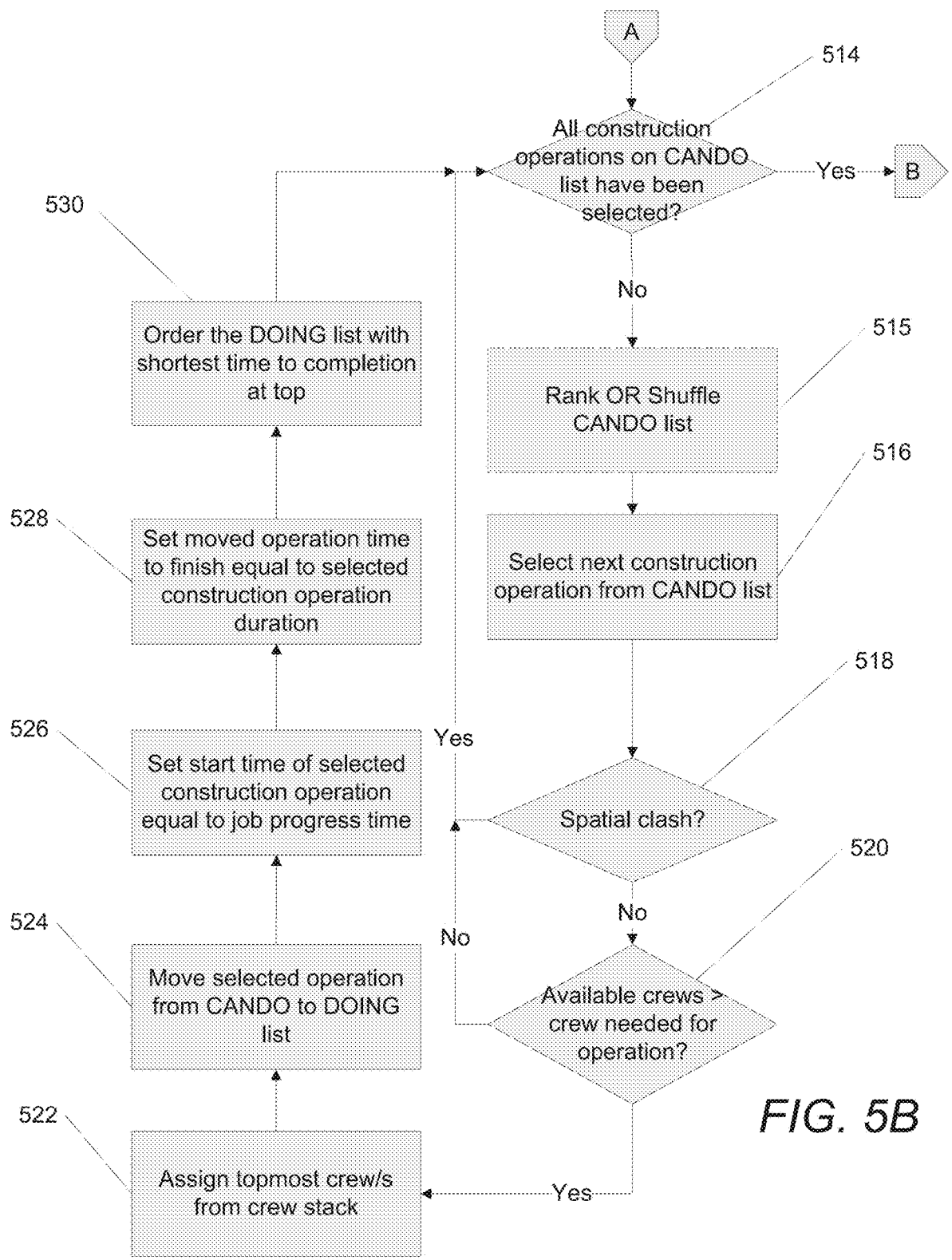
Figure 5C:
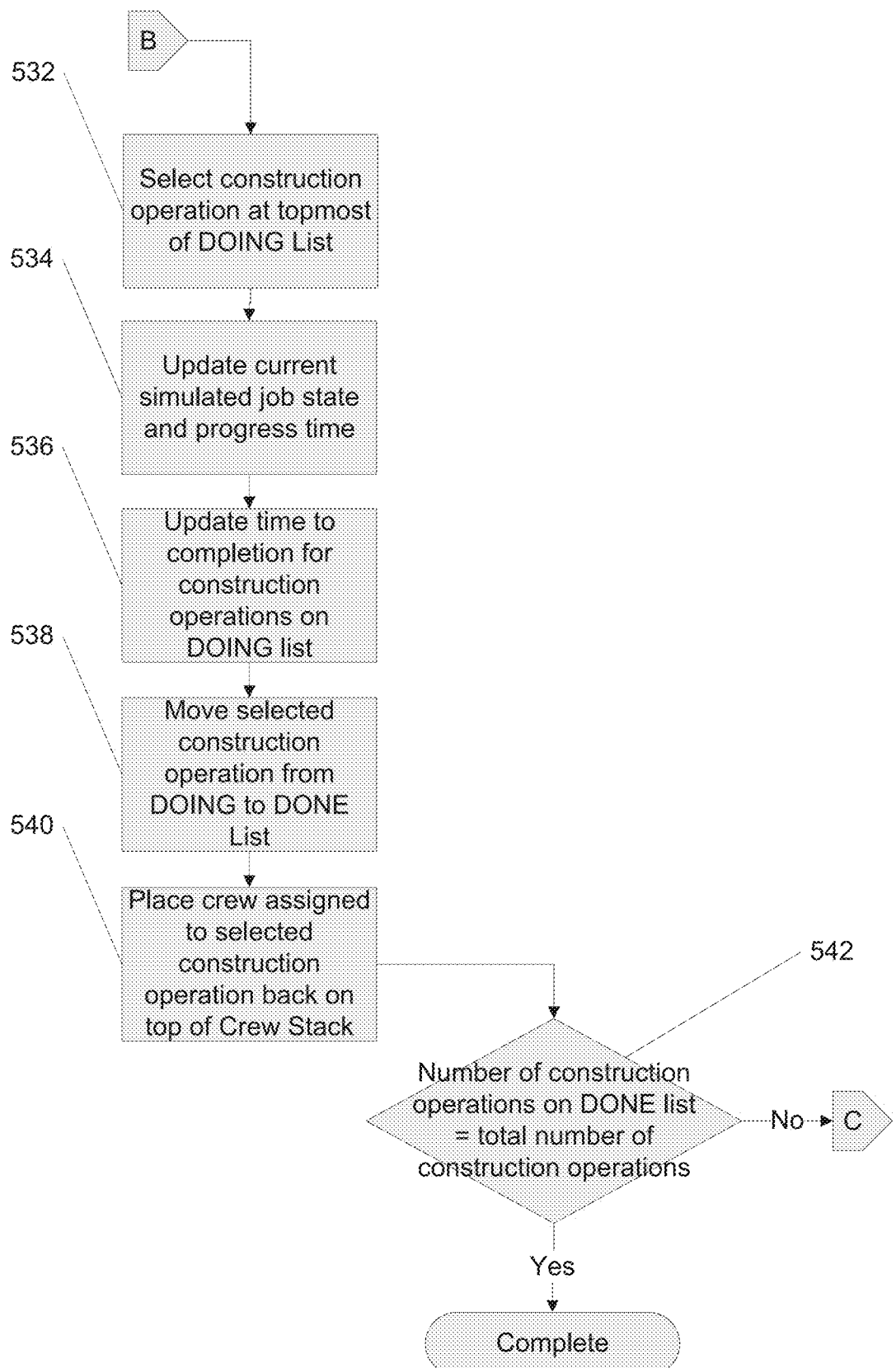

Construction projects typically have a limited amount of space and/or resources to perform construction operations to create a structure. A process for generating schedules in consideration of space and resource requirements in accordance with an embodiment of the invention is illustrated in FIGS. 5A-5C. The process 500 includes initializing (501) a simulated job state and job progress time. In several embodiments, the simulated job state reflects the different states in a construction project. In many embodiments, the simulated job state can describe construction operations that have been completed. In various embodiments, the job progress time describes the simulated elapsed time. The process further includes generating (502) a TODO list of construction operations. In several embodiments, the construction operations can be selected from a list of operations generated using the techniques including (but not limited to) those discussed above.

An example of a portion of a TODO list in accordance with an embodiment of the invention is illustrated in FIG. 5D. The TODO list 550 includes a list of construction operations identified by a unique identifier 552 and a construction operation description (553). Each construction operation has a duration 554, and a definition of at least one specific space requirement (558, 560, 562, 564). In the illustrated embodiment, the definition of at least one specific space requirement involves a description of two space requirements in terms of X, Y, Z coordinates. The spaces are assumed to be rectangular and are defined relative to a specific floor space occupied on a floor (inferred by the Z coordinate). In other embodiments, any of a variety of techniques can be utilized to identify each specific space requirement. In several embodiments, a construction operation can include predecessor requirements (556). A construction operation that does not include predecessor requirements is a construction operation that can commence immediately on a job site. Other construction operations can include one or more predecessor requirements that must be satisfied for the construction operation to commence. In several embodiments, the resource requirements for each construction operation can also be specified within a TODO list. Although a specific example of construction operations listed in a TODO list is illustrated in FIG. 5D, any of a variety of techniques can be utilized to store data related to a set of construction operations that are provided as an input to a construction scheduling process in accordance with an embodiment of the invention.

Once a TODO list of construction operations is generated, a construction operation is selected (504) from the TODO list. The process includes deciding (506) whether all the predecessor construction operations for the selected operation are present in the DONE list. If all the predecessors are not present, then a new construction operation is selected (504) from the TODO list. However, if all the predecessors are present in the DONE list, then the selected construction operation is moved (508) from the TODO list to a CANDO list. The process includes deciding (510) whether all of the construction operations on the TODO list with predecessors have been moved to the CANDO list. If all construction operations with predecessors have not been moved, then another construction operation on the TODO list is selected (504) and the process repeats from step 504. If all the construction operations on the TODO list with predecessors have been moved to the CANDO list, then the process continues as illustrated in FIG. 5B.

A determination is made (514) as to whether all of the construction operations on the CANDO list have been selected. If all the construction operations on the CANDO list have been selected, then the process continues as illustrated in FIG. 5C. If all of the construction operations on the CANDO list have not been selected, then the order of the remaining construction operations on the CANDO list is changed (515) to create variations in the sequence of construction operations when the simulation is repeated. In various embodiments, the order can be changed in a random fashion or according to a ranking preference.

In several embodiments, the CANDO list is ranked or shuffled (515) and a construction operation is selected (516) from the CANDO list. The ranking (515) of the CANDO list is optional, but provides a mechanism whereby the order in which specific tasks are performed based upon factors including (but not limited) spatial proximity and/or importance can be determined through ranking. In many embodiments, the rankings can be manually determined by a user and/or determined using a set of predetermined criteria. In several embodiments, ranking can be used to influence space utilization. For example, work crews can sweep across a floor in a sequential manner through adjacent spaces as opposed to being assigned to spatial locations in a random sequence. Other options are to randomly or pseudo randomly shuffle (515) the CANDO list.

The process further includes deciding (518) whether a spatial clash exists between the selected construction operation from the CANDO list and any construction operation currently in a DOING list. In a number of embodiments, the process for identifying spatial clashes uses X,Y,Z coordinates of construction operation space requirements (or other identifications of a specific space requirement within a job site) to determine spatial clashes. In various embodiments, spatial clashes between two or more construction operations can be determined by observing overlap of specific space requirements of each construction operation. In several embodiments, a spatial overlap is determined to be a spatial clash. In many embodiments, when a spatial overlap is detected the extent of the spatial overlap can be utilized to determine whether the spatial overlap constitutes a spatial clash. In a number of embodiments, the extent of the spatial overlap is used to determine the impact of the reduction in construction operation space availability on productivity and a spatial clash can be determined based upon construction operation productivity in accordance with a predetermined criterion. In other embodiments, any of a variety of processes and criteria can be utilized to determine whether a spatial overlap constitutes a spatial clash. If a spatial clash is detected, then a new operation is selected (512) from the CANDO list and the process repeats from step 512. If a spatial clash is not detected, then the process includes deciding (520) the number of work crews that can fit into an available space and whether work crews skilled to perform the selected operation are currently available. If a work crew is not available, then a new construction operation is selected (512) from the CANDO list and the process repeats from step 512. If one or more work crews are available to perform the selected construction operation, then the work crews at the top of a pertinent crew stack is assigned (522) and the construction operation duration determined based upon the number of available crews assigned to the task in accordance with a process similar to the process outlined above. The crew stacks include currently available work crews and the crew stacks are classified based on the skill sets. A pertinent crew stack to a particular construction operation is a crew stack that includes work crews that can perform a particular type of construction operation. In many embodiments, the crew stacks organize work crews by a last in first out (LIFO) data structure to reduce idle costs (costs associated with paying work crews on days and/or hours that they are not physically working). In other embodiments, any of a variety of techniques can be utilized to allocate work crews based upon any of a variety of criteria including but not limited to real-world factors related to the cost of employing specific crews during construction and during idle days.

Once one or more work crews are assigned to a construction project, the selected construction operation is moved (524) from the CANDO list to the DOING list. In many embodiments, a start time for the selected construction operation is set (526) equal to the job progress time. In many embodiments, the construction operation's time to completion is set (528) equal to the duration of the construction operation where the duration of the construction operation can be calculated utilizing methods including (but not limited to) those discussed above. The process further includes sorting the order (530) of the construction operations on the DOING list such that the construction operation with the shortest time to completion is placed at the top of the DOING list. The process repeats to step 512 where a new construction operation from the CANDO list is selected (512). Once all the operations on the CANDO list have been selected, the process continues as illustrated in FIG. 5C.

The process 500 further includes selecting (532) the construction operation at the topmost of the DOING list, the operation with the least time to completion (designated as completed). The specific space(s) allocated to the selected construction operation is made available for other construction operations. The simulated job state and job progress time are updated (534). In many embodiments, the job state is defined by the construction operations present in the TODO, CANDO, DOING, DONE lists and the current job progress time. In many embodiments, the job progress time is updated by adding the time to completion of the construction operation last moved to the DONE list to a running total. In several embodiments, the time to completion for each operation on the DOING list is updated (536) by subtracting the time to completion of the construction operation last moved to the DONE list. The selected construction operation is moved (538) from the DOING list to a DONE list. The work crew previously assigned to the selected construction operation is released and placed back (540) on top of the appropriate crew stack. In other embodiments, all tasks that are completed can be moved from the DOING list to the DONE list before attempting schedule additional construction operations from the TODO and CANDO lists. If the number of construction operations on the DONE list is equal to the total number of construction operations that were on the TODO list, then the process is complete. If the number of construction operations in the DONE list is less than the number of construction operations that were originally in the TODO list then the process selects (504) the next construction operation from the TODO list and continues the scheduling process. In many embodiments, the schedule is the DONE list with each construction operation having an associated start time and end time where the start time is set as described above and the end time can be calculated by the start time plus the duration of the construction operation as described above. In several embodiments the duration of a construction operation changes and this new duration is used to update its time to completion and its expected or actual finish time.

Although specific processes for generating schedules in consideration of space and resources are discussed above with respect to FIGS. 5A-5C, any of a variety of processes for generating schedules in consideration of space and resource requirements as appropriate to the requirements of a specific application can be utilized in accordance with embodiments of the invention. Processes for using a list of operations to generate multiple schedules in accordance with embodiments of the invention are discussed further below.

Generating Multiple Schedules

Multiple schedules allow a user to select a schedule that best satisfies predetermined project objectives. Schedules vary by the sequence in which construction operations take place (i.e. the actual start times assigned to construction operations). Accordingly, processes in accordance with embodiments of the invention can generate thousands of schedules by varying the order in which specific construction processes are scheduled to attempt to identify an appropriate construction schedule in accordance with criteria that can include (but are not limited to) construction duration and/or cost. In several embodiments, the overall approach of the construction scheduler is to place work crews in available spaces within a construction site at any given time and multiple schedules are generated by randomly varying the order in which construction operations are scheduled into the available space. As construction operations have different durations, utilize different resources and can be predecessor requirements for different construction operations within the space, varying the order in which construction operations are scheduled within the space can significantly impact the duration of the overall project and/or the number of times work crews (resources) are idle and/or total cost of project and/or workflow and other project parameters.

Figure 6:
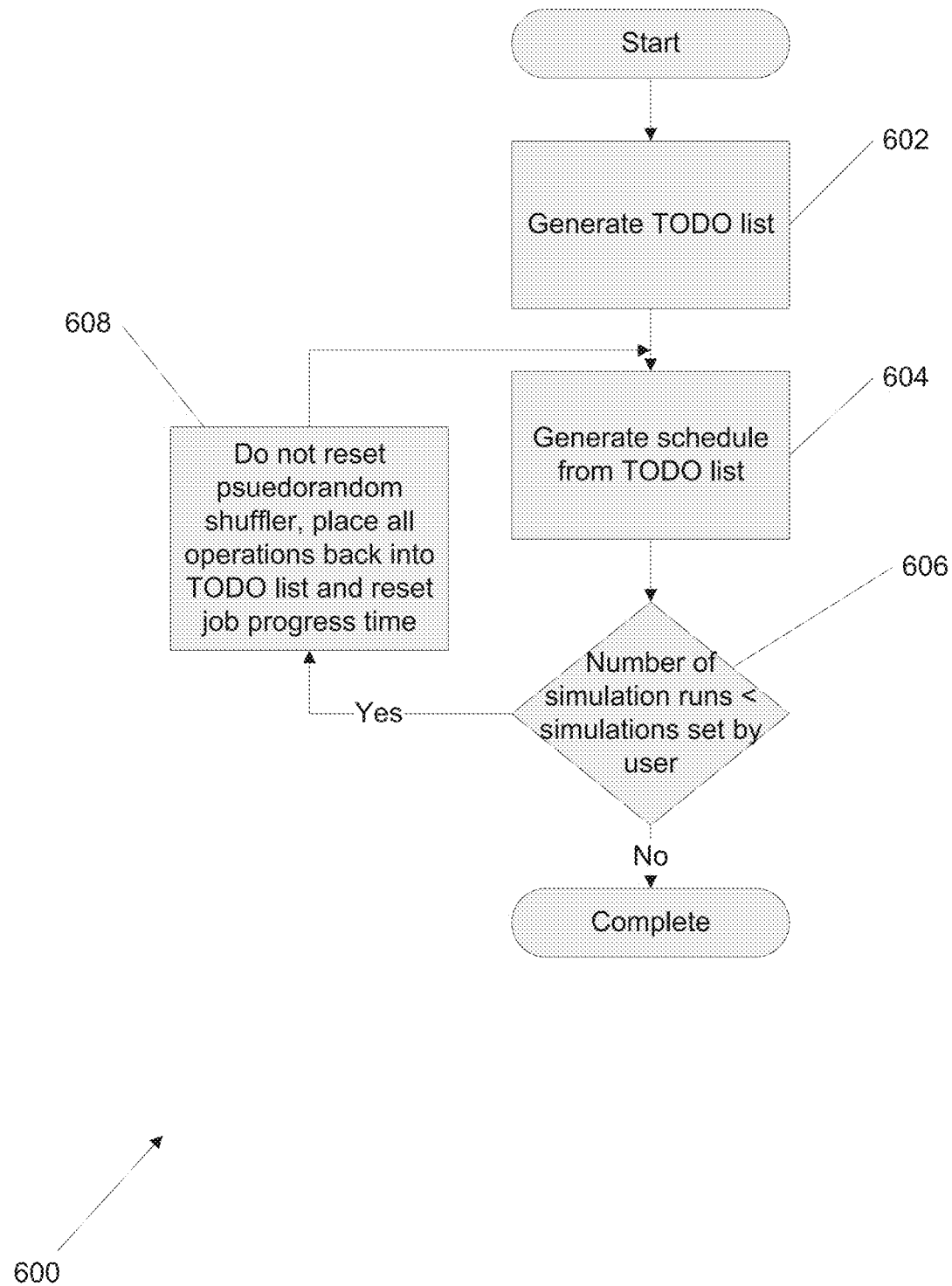
FIG. 6 is a flow chart illustrating a process for generating multiple schedules using a pseudorandom shuffler in accordance with an embodiment of the invention.

A process for generating multiple schedules in accordance with an embodiment of the invention is illustrated in FIG. 6. The process 600 includes generating (602) a TODO list of construction operations to create an end product. In many embodiments, the TODO list is generated using the techniques described above. The process further includes generating (604) a schedule using the construction operations on the TODO list. In many embodiments, the schedule is generated utilizing the techniques described above. A decision is made (606) as to whether the simulation has been performed as many times as set by a user. If the number of simulation runs is less than the number of simulation runs set by a user then all operations are placed back into the TODO list and the pseudorandom shuffler that shuffles the CANDO list, is not reset and the process goes to Start of FIG. 5A. Resetting the pseudorandom shuffler would result in the generation of the same schedule. By simply continuing the shuffler process, the shuffling sequence will vary from one simulated to the next yielding different schedules. In certain embodiments of the invention, the shuffler can just be random however this will result in a different set of schedules every time the algorithm is run, using a pseudorandom shuffler generates the same set of schedules for remotely located users. If the number of simulation runs is equal to or greater than that set by the user, then the process is complete.

Although processes for generating multiple schedules are discussed above with respect to FIG. 6, any of a variety of processes for generating multiple schedules as appropriate to the requirements of a specific application can be utilized in accordance with embodiments of the invention. Processes for calculating costs associated with implementing a schedule in accordance with embodiments of the invention are further discussed below.

Costs of Implementing a Schedule

Figure 7:
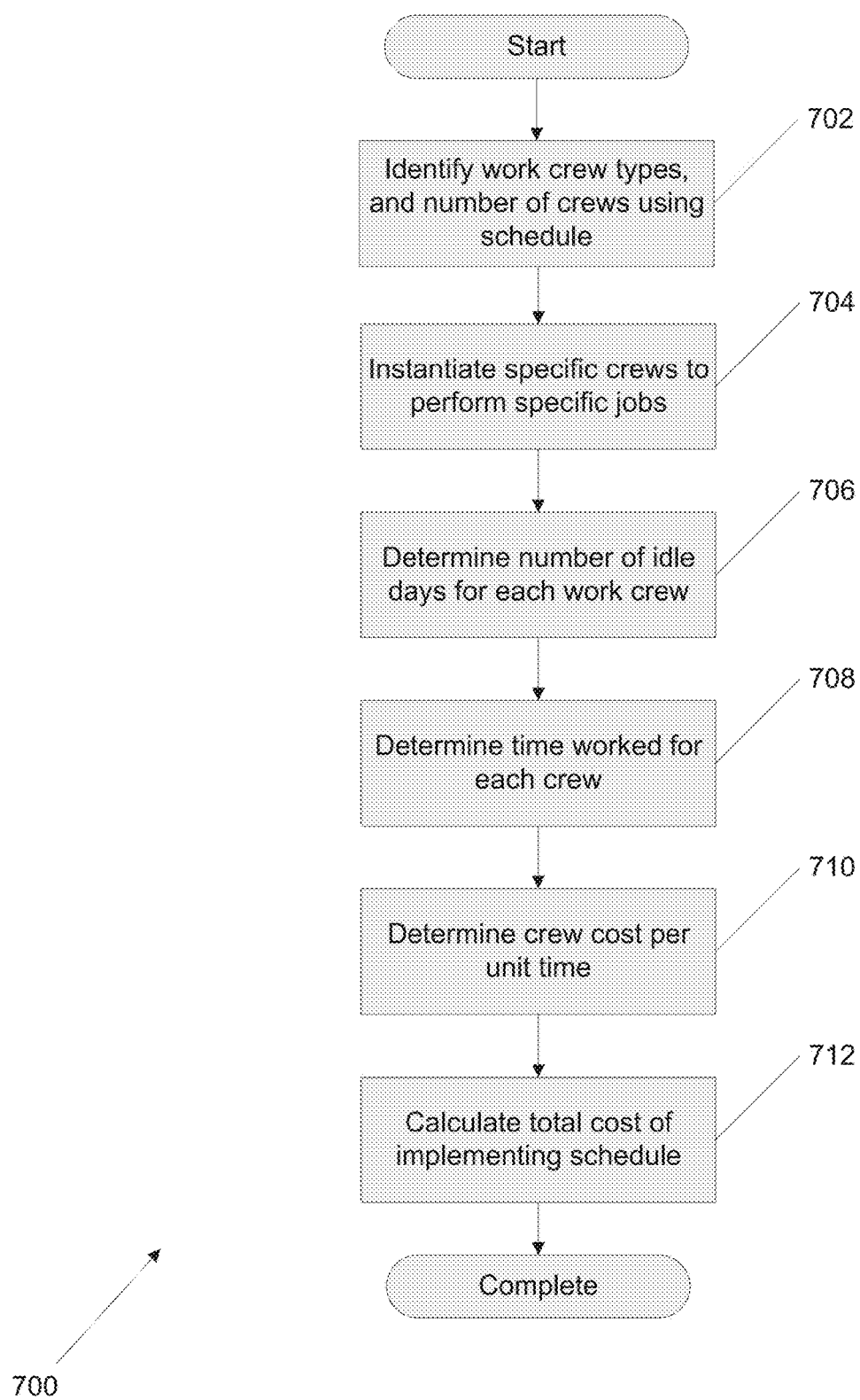
FIG. 7 is a flow chart illustrating a process for calculating the total cost of implementing a schedule in accordance with an embodiment of the invention.

A schedule can be selected from multiple scheduling options by comparing the costs associated with implementing each schedule and selecting the schedule with the lowest costs. A process for calculating the costs associated with implementing a schedule in accordance with an embodiment of the invention is illustrated in FIG. 7. The process 700 includes identifying (702) the type of crew, and number of crews on a construction operation using the schedule. In several embodiments, the specific crews that are utilized to perform the construction operation can be specified in the schedule or can be instantiated, for example the two crews performing the work are specified as Crew A, and Crew B (704). In several embodiments, the number of idle days for each work crew is determined (706). The idle days indicate the days and/or hours that work crews are paid even when they are not working during the duration of the project. In many embodiments, the time worked for each crew is determined (708) using the start and stop times for each crew provided by the schedule. In many embodiments, the number of idle days can also be determined for each crew using the schedule. The process further includes calculating (710) the total cost to implement the schedule. In various embodiments, a cost per crew can be calculated by adding the time worked and the idle time for each work crew and multiplying the sum by the crew cost per unit time. In many embodiments, the total costs to implement a schedule can be calculated by adding up the costs per crew.

Although specific processes for calculating the costs to implement a schedule are discussed above with respect to FIG. 7, any of a variety of processes for calculating the costs to implement a schedule as appropriate to the requirements of a specific application can be utilized in accordance with embodiments of the invention. Processes for generating schedules giving priority to particular construction operations in accordance with embodiments of the invention are discussed further below.

Visualizing Schedules

Since the spatial requirements for each construction operation are known (with one or more sets of X,Y,Z coordinates) and the start and end times of each operation are also known, the results can be linked to a 3D model in such a way that the completion of construction operations as the schedule is performed can be visualized as a 4D model. In several embodiments, specific construction operations being performed within specific spaces within the construction site can be indicated by utilizing visual representations of specific work crews and construction operation space requirements/space availability using semi-transparent boundaries that identify volumes in 3D space or portions of floor plans corresponding to 3D spaces. In many embodiments, any of a variety of visual cues can be utilized to assist in the visualization of work crews filling available space within a construction site and the space requirements of the construction crews as they work.

Updating Schedules to Reflect Actual Progress

Once a schedule is selected, an attempt can be made to execute the schedule. The actual available resources are used to specify the estimated start and end dates of construction operations. The actual progress can be measured versus the predicted progress and used to specify the estimated end dates of construction operations. The actual resources that are available can also be used to revise the estimated end dates of construction operations. These revised dates for estimated start and end times for construction operations effectively create a new schedule. If this schedule does not meet project goals then a new schedule can be generated based upon conditions on the current state of the job site (i.e. actual CANDO, DOING, and DONE lists) and resource availability.

Figure 8:
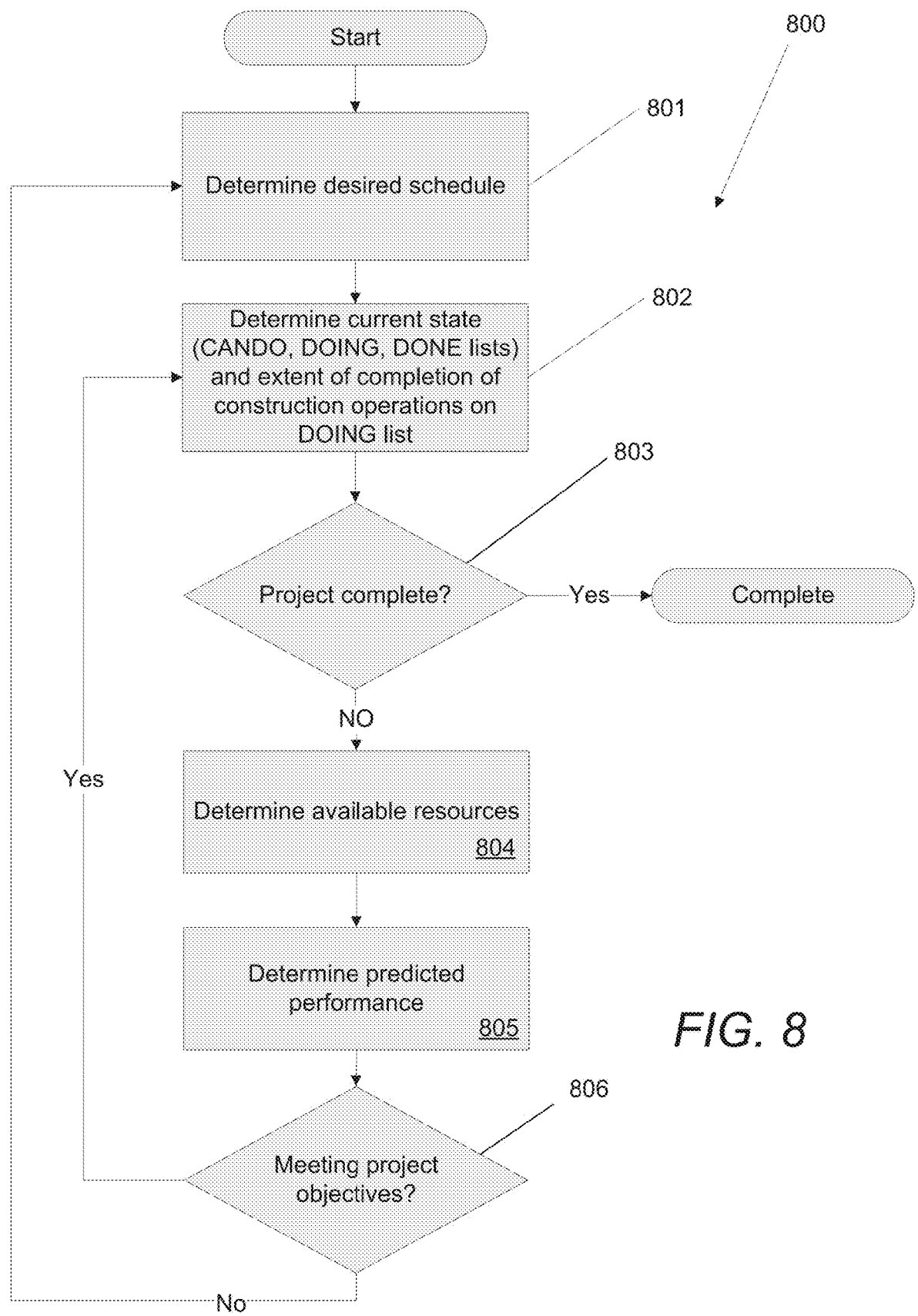
FIG. 8 is a flow chart illustrating a process for updating a schedule with actual progress and generating a new schedule based on current progress in accordance with an embodiment of the invention.

A process for generating a new schedule during the construction of an end product in accordance with an embodiment of the invention is illustrated in FIG. 8. The process 800 includes determining (801) a desired schedule and as the project progresses determining (802) current project state, which corresponds to constructing a CANDO, DOING and DONE list similar to the corresponding lists described above with respect to FIGS. 5A-5C with respect to construction operations from the original TODO list. In several embodiments, populating the DOING list involves determining the percentage of completion of the construction operations that are underway and/or an estimated time to completion. When the current project state indicates that the project is completed (803), then the process 800 ends. Otherwise, the available resources are determined (804) and associated with the DOING list and with an available resources stack (or other appropriate data structure). A prediction (805) can then be made concerning the performance of the construction project. The prediction can include such factors as (but not limited to) time to completion and estimated cost of completion. Based upon the prediction, a determination (806) can be made concerning whether predetermined construction project objectives are being met, which can be specified in terms of any of a variety of criteria including (but not limited to) duration and cost criteria. In the event that the projective objectives are being met, the process 800 continues to use the existing schedule and the current state of the project can be subsequently updated to continue to monitor the progress of the construction project. In the event that the construction project objectives are not being met, a new schedule can be generated (801) that meets the predetermined project objectives in a manner similar to that described above with respect to FIGS. 5A-5C. In several embodiments, new project objectives can be provided accommodating for the divergence of the construction project from the originally selected schedule.

Although specific processes for generating a new construction schedule in response to divergence of a construction project from an originally generated schedule are described above, any of a variety of processes for generating new schedules that meet project objectives based upon the current state of a construction project and available resources can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A schedule generation system, comprising:
a processor;
a memory connected to the processor and configured to store a scheduling application;
wherein the scheduling application simulates the construction of a building to generate a construction schedule by directing the processor to:
generate a TODO list comprising a plurality of construction operations automatically using a 3D computer aided design (CAD) model, where the construction operations comprise at least one specific space requirement within a construction site defined based on a plurality of architectural elements, resource requirements, and a duration time and at least some of the construction operations further comprise at least one predecessor condition, wherein the duration time is calculated using a first production modification factor, a second production modification factor, a number of crews, crew productivity, and a quantity of construction components acted on by a construction operation;
the first production modification factor is determined from a construction operation space requirement and construction operation space availability; and
the second production modification factor is determined using a space requirement of a crew, a number of crews and construction operation space availability;
initialize a simulated job state and a simulated job progress time, where the simulated job state comprises a description of construction operations that have been completed, and the simulated job progress time describes the elapsed simulated time;
identify at least one construction operation in the TODO list, where all predecessor conditions are satisfied by the current simulated job state;
move construction operations where all predecessor conditions are satisfied by the current simulated job state to a CANDO list;
identify at least one construction operation in the CANDO list, where the resource requirements are available at the current simulated job progress time and the spatial requirements do not clash with a construction operation on a DOING list;
move identified at least one construction operation from the CANDO list to the DOING list, where adding a construction operation to the DOING list comprises allocating space and resources;
update the simulated job progress time;
identify at least one construction operation on the DOING list that is completed at the current simulated job progress time and move the at least one construction operation to a DONE list, where moving the construction operation to the DONE list comprises releasing allocated space and resources and updating the simulated job state;
generate a desired construction schedule using the DONE list;
determine the current project state reflecting the real world status of construction;
compare the current project state with the simulated job state;
re-simulate the construction of the building based on the current project state to produce a new desired construction schedule; and
generate a visual representation of the new desired construction schedule, where the visual representation is a 4D model which links the new desired construction schedule to the 3D CAD model to form an animated step-by-step visualization of the progression of construction operations in a series of sequential events.

2. The schedule generation system of claim 1, wherein the scheduling application further configures the processor to define the specific space requirements within the construction site based on a plurality of architectural elements using one or more X, Y, and Z coordinates.

3. The schedule generation system of claim 1, wherein the scheduling application further configures the processor to identify at least one construction operation in the CANDO list, where the resource requirements are available at the simulated current job progress time and the spatial requirements do not clash with a construction operation on the DOING list by comparing space requirements between construction operations for overlap and determining whether the extent of the overlap constitutes a spatial clash in accordance with at least one predetermined criterion.

4. The schedule generation system of claim 3, wherein the scheduling application further configures the processor to move the identified at least one construction operation from the CANDO list to the DOING list by changing the order of construction operations on the CANDO list and identifying at least one construction operation from the reordered CANDO list.

5. The schedule generation system of claim 3, wherein the scheduling application further configures the processor to move the identified at least one construction operation from the CANDO list to the DOING list, where adding a construction operation to the DOING list further comprises setting a start time for the identified at least one construction operation equal to the current simulated job progress time.

6. The schedule generation system of claim 3, wherein the scheduling application further configures the processor to move the identified at least one construction operation from the CANDO list to the DOING list, where adding a construction operation to the DOING list further comprises setting a time remaining for completion for the identified at least one construction operation equal to the duration time.

7. The schedule generation system of claim 3, further comprising:
sorting the order of the construction operations on the DOING list such that the construction operation with the shortest time to completion is placed at the top of the DOING list; and
designating the construction operation at the top of the DOING list as completed.

8. The schedule generation system of claim 7, wherein the scheduling application further configures the processor to identify at least one construction operation on the DOING list that is completed at the current simulated job progress time and move at least one construction operation to a DONE list, where moving the construction operation to the DOING list further comprises updating the time remaining for completion for each construction operation on the DOING list and releasing allocated resources.

9. The schedule generation system of claim 1, wherein the scheduling application further configures the processor to generate the CANDO list comprising a plurality of construction operations, where the construction operations are ranked for space utilization preference or shuffled in the CANDO list using a random shuffler to generate a plurality of construction schedules involving different utilizations of specific spaces within the construction site over time.

10. The schedule generation system of claim 1, wherein the simulated job state further comprises a description of construction operations that are ready to be performed, and construction operations that are in progress.

11. The schedule generation system of claim 1, wherein each of the plurality of construction operations in the TODO list further comprise a unique identifier corresponding to the at least one specific space requirement within the construction site, the duration time, and the at least one predecessor conditions.

12. A method of generating a schedule for constructing a building by simulating the construction of the building using a schedule generation system, comprising:
generating a TODO list comprising a plurality of construction operations automatically using a 3D computer aided design (CAD) model, where the construction operations comprise at least one specific space requirements within a construction site defined based on a plurality of architectural elements, resource requirements, and a duration time and at least some of the construction operations further comprise at least one predecessor conditions, wherein the duration time using a first production modification factor, a second production modification factor, a number of crews, crew productivity, and a quantity of construction components acted on by a construction operation; wherein the first production modification factor is determined from a construction operation space requirement and construction operation space availability; and wherein the second production modification factor is determined using a space requirement of a crew, a number of crews, and construction operation space availability;
initializing a simulated job state and a simulated job progress time, where the simulated job state describes construction operations that have been completed, and currently taking place and the simulated job progress time describes the elapsed simulated time;
identifying at least one construction operation in the TODO list, where all predecessor conditions are satisfied by the current simulated job state;
moving construction operations where all predecessor conditions are satisfied by the current simulated job state to a CANDO list;
identifying at least one construction operation in the CANDO list that can be scheduled to fill available space within the construction site at the simulated job progress time, where the resource requirements are available at the current simulated job progress time and the spatial requirements do not clash with a construction operation on a DOING list;
moving identified at least one construction operation from the CANDO list to the DOING list, where adding a construction operation to the DOING list comprises allocating space and resources;
updating the simulated job progress time;
identifying at least one construction operation on the DOING list that is completed at the current simulated job progress time and moving the at least one construction operation to a DONE list, where moving the construction operation to the DONE list comprises releasing allocated space and resources and updating the simulated job state;
generating a desired construction schedule using the DONE list;
determining the current project state reflecting the real world status of construction;
comparing the current project state with the simulated job state;
re-simulating the construction of the building based on the current project state to produce a new desired construction schedule; and
generating a visual representation of the new desired construction schedule, where the visual representation is a 4D model which links the new desired construction schedule to the 3D CAD model to form an animated step-by-step visualization of the progression of construction operations in a series of sequential events.

13. The method of claim 12, wherein the specific space requirements within the construction site based on a plurality of architectural elements are defined using one or more X, Y, and Z coordinates.

14. The method of claim 12, wherein identifying at least one construction operation in the CANDO list, where the resource requirements are available at the current simulated job progress time and the spatial requirements do not clash with a construction operation on a DOING list further comprises comparing space requirements between construction operations for overlap.

15. The method of claim 14, wherein identifying at least one construction operation in the CANDO list that can be scheduled to fill available space within the construction site at the simulated job progress time further comprises scheduling jobs construction operations in the CANDO list so that available space can be utilized to schedule construction operations.

16. The method of claim 14, wherein moving the identified at least one construction operation from the CANDO list to the DOING list further comprises changing the order of remaining construction operations on the CANDO list and identifying at least one construction operation.

17. The method of claim 14, wherein moving the identified at least one construction operation from the CANDO list to the DOING list, where adding a construction operation to the DOING list further comprises setting a start time for the identified at least one construction operation equal to the current simulated job progress time.

18. The method of claim 14, wherein moving the identified at least one construction operation from the CANDO list to the DOING list, where adding a construction operation to the DOING list further comprises setting a time to completion for the identified at least one construction operation equal to the duration time.

19. The method of claim 14, wherein moving the identified at least one construction operation from the CANDO list to the DOING list, where adding a construction operation to the DOING list further comprises:
    sorting the order of the construction operations on the DOING list such that the construction operation with the shortest time to completion is placed at the top of the DOING list; and
    designating the construction operation at the top of the DOING list as completed.

20. The method of claim 19, wherein the identifying at least one construction operation on the DOING list that is completed at the current simulated job progress time and moving the at least one construction operation to a DONE list, where moving the construction operation to the DONE list further comprises updating the time to completion for each construction operation on the DOING list.

21. The method of claim 12, wherein generating a CANDO list comprising a plurality of construction operations, further comprises ranking the construction operations for scheduling according to ranking criteria.

22. The method of claim 12, further comprising:
    generating multiple construction schedules;
    wherein the order of the CANDO list is shuffled during the generation of the multiple construction schedules, thereby changing the sequence in which construction operations are scheduled.

23. The method of claim 12, wherein the simulated job state further comprises a description of construction operations that are ready to be performed, and construction operations that are in progress at a given current simulated job progress time.

24. The method of claim 12, further comprising generating the CANDO list comprising a plurality of construction operations, where the construction operations are shuffled in the CANDO list using a random shuffler to generate a plurality of construction schedules involving different utilizations of specific spaces within the construction site over time.

25. The method of claim 12, wherein each of the plurality of construction operations in the TODO list further comprise a unique identifier corresponding to the at least one specific space requirement within the construction site, the duration time, and the at least one predecessor conditions.

* * * * *